Patented Feb. 3, 1931

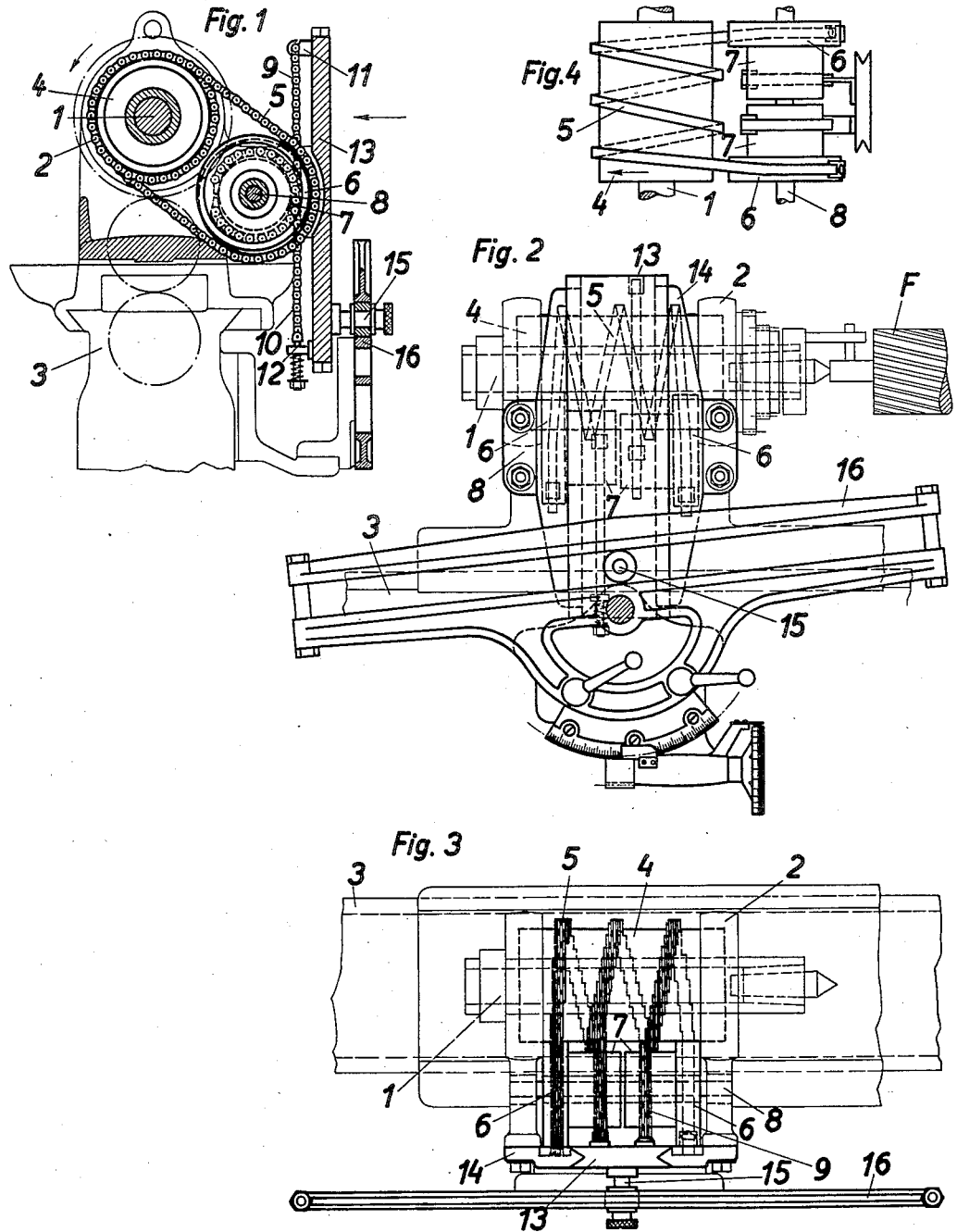

1,791,424

UNITED STATES PATENT OFFICE

KURT METZLER, OF GROSSENHAIN, SAXONY, GERMANY

ROTARY FEED DEVICE FOR THE WORK SPINDLES OF TOOL-GRINDING MACHINES

Application filed February 13, 1930, Serial No. 428,190, and in Germany February 20, 1929.

I have already proposed, in machines intended more particularly for the grinding of milling cutters with helical teeth, to support the spindle carrying the work in a freely rotatable manner. Under these circumstances there is supported on the saddle a transverse slide, which is transversely displaced by a stationary guide during the longitudinal displacement of the saddle in the direction of the longitudinal axis of the spindle. This transverse displacement is transmitted to the spindle in the form of a rotation by a chain coiled round the tool spindle or a drum arranged upon it. The turns of the chain grip the spindle, so to speak, but permit a rotation of the spindle in one direction, namely the releasing direction of the turns of the chain, so that the self-braked spindle can be rotated for feeding purposes after each working stroke, which is necessary for the purpose of bringing fresh positions, that is to say fresh teeth of the workpiece, within reach of the grinding medium.

Since the magnitude of the slide movement is limited, a rotation of the work spindle has not hitherto been brought about with sufficient amplitude during the working stroke, so that milling cutters for example in which the inclination, in the case of modern tools, may be as high as 45 degrees, could not be ground.

In order to obviate this disadvantage, according to the invention the slide rotates an auxiliary shaft, from which the chain acts upon the actual work spindle through transmission means. Since the transmission ratio can now be selected at will, it is possible to carry out the treatment of tools with the maximum inclinations.

There is preferably arranged upon the auxiliary shaft a two-stage drum, to one stage of which the ends of the chain elements are secured. The other ends are secured to opposite points on the slide. Furthermore the ends of the chain coiled round the spindle drum are secured to the other stage of the drum mounted upon the auxiliary shaft.

One constructional example of the invention is illustrated in the accompanying drawings, in which Figure 1 is a cross-sectional elevation,
Figure 2 a front view looking in the direction of the arrow in Figure 1,
Figure 3 a view from above, and
Figure 4 a diagrammatic plan view showing the arrangement and securing of the chains.

The work spindle 1 is supported in a freely rotatable manner in the saddle 2. The saddle is slidable in the direction of the longitudinal axis of the spindle upon its bed 3. To the spindle is secured a drum 4. Round this drum is coiled for a number of turns the known link chain 5. Each of the two ends of the chain is secured to a second auxiliary drum, having two steps 6 and 7 in its diameter. The second drums are supported without being keyed upon a shaft 8 parallel to the spindle 1 and rotatable in the saddle. As will be seen, the ends of the chain 5 are attached to the step of larger diameter on the second drum, this being effected in such a way that when this drum rotates, the chain winds up at one end upon the auxiliary drum and unwinds at the other end.

To the smaller step 7 of the auxiliary drum two lengths of chain 9 and 10 are attached by one end, being of course displaced relatively to one another and coiled in opposite directions, and the other ends are secured at 11 and 12 to opposite points on the slide 13. At 12 is provided a resilient fastening of the end of the chain 10 to the slide, for the purpose of compensating for stresses in a manner known in itself.

The slide 13 is so supported on the saddle 2 in guides 14 as to be displaceable transversely to the longitudinal axis of the spindle 1. The displacement is effected in a known manner by a roller mounted upon a pivot 15 on the slide running in a guiding slot 16, which is oscillatably mounted on the machine frame so that its inclination is adjustable. According to the degree of obliquity of this guide the pivot 15 is displaced with the slide 13 during the longitudinal displacement of the saddle 2. The displacement is transmitted by the chains 9 and 10 to the auxiliary drum, and the rotation thereof is transmitted by the chain 5 to the drum 4, and therefore to the spindle 1. By the steps 6 and 7 on the auxiliary drum a transmission ratio is obtained which enables the limited stroke of the slide 13 to be transmitted to the work spindle with an increase in amplitude, so that workpieces F, as shown in Figure 2, which consist in milling cutters with an inclination of 45 degrees, can be successfully ground.

During or after the return of the saddle 2 the feeding of the work spindle 1 takes place each time, in order that a fresh cutting edge of the milling cutter F may be brought into engagement with the grinding wheel.

The two-stepped auxiliary drum arranged upon the shaft 8 consists of two parts, each of which is freely rotatable upon the shaft 8, so that the two parts can also be rotated relatively to one another. The length of chain 10 secured to the slide 13 is therefore yieldingly secured by virtue of a spring 12', because during the feeding of the spindle and of the milling cutter for the tooth pitch, that is, in the direction of the arrow in Figures 1 and 4, in order to eliminate the breaking action on the drum 4, the chain 5 has to be somewhat loosened, for which purpose the drum 7 of the chain 10 has to rotate through a small angle in the same direction.

What I claim is:—

1. A rotary feed device for the freely rotatable work spindle of a tool grinding machine, more particularly for grinding milling cutters with helical teeth, comprising a chain coiled round the work spindle, a saddle reciprocable in the longitudinal direction of the work spindle, a slide so mounted in the saddle as to be slidable transversely to the longitudinal direction of the work spindle, an adjustable inclined slot guide adapted to cause the slide to move transversely as the saddle reciprocates, an auxiliary drum rotatably mounted on the saddle, the ends of the chain coiled round the work spindle being secured to the auxiliary drum, and transmission gear by which the slide as it reciprocates rotates the auxiliary drum.

2. A rotary feed device for the freely rotatable work spindle of a tool grinding machine, more particularly for grinding milling cutters with helical teeth, comprising a spindle drum secured to the work spindle, a chain coiled round the spindle drum, a spring adapted to tension the chain resiliently, a saddle reciprocable in the longitudinal direction of the work spindle, a slide so mounted in the saddle as to be slidable transversely to the longitudinal direction of the work spindle, adjustable means adapted to cause the slide to move transversely as the saddle reciprocates, an auxiliary drum rotatably mounted on the saddle, the ends of the chain coiled round the work spindle being secured to the auxiliary drum, and transmission gear by which the slide as it reciprocates rotates the auxiliary drum.

3. A rotary feed device for the freely rotatable work spindle of a tool grinding machine, more particularly for grinding milling cutters with helical teeth, comprising a chain coiled round the work spindle, a saddle reciprocable in the longitudinal direction of the work spindle, a slide so mounted in the saddle as to be slidable transversely to the longitudinal direction of the work spindle, an adjustable inclined slot guide adapted to cause the slide to move transversely as the saddle reciprocates, a stepped auxiliary drum rotatably mounted on the saddle, the ends of the chain coiled round the work spindle being secured to the auxiliary drum, at the greater diameter thereof, and two further chains partly coiled round the auxiliary drum in opposite directions at its smaller diameter and secured to it by one end, and each secured by its other end to the slide, on opposite sides of the auxiliary drum, so that as the slide reciprocates the auxiliary drum is constrained to rotate.

4. A rotary feed device for the freely rotatable work spindle of a tool grinding machine, more particularly for grinding milling cutters with helical teeth, comprising a chain coiled round the work spindle, a saddle reciprocable in the longitudinal direction of the work spindle, a slide so mounted in the saddle as to be slidable transversely to the longitudinal direction of the work spindle, an adjustable inclined slot guide adapted to cause the slide to move transversely as the saddle reciprocates, an auxiliary drum in two independent stepped parts each rotatably mounted on the saddle, each end of the chain coiled round the work spindle being secured to one of the parts of the auxiliary drum at the greater diameter thereof, two auxiliary chains each partly coiled round one of the parts of the auxiliary drum at its smaller diameter in opposite directions and secured to the said part by one end, and each secured by its other end to the slide, on opposite sides of the auxiliary drum, and a spring interposed between one end of one of the auxiliary chains and the slide to enable the chain coiled round the spindle to loosen during the rotary feeding of the work.

In testimony whereof I have signed my name to this specification.

KURT METZLER.